(12) United States Patent
Lin et al.

(10) Patent No.: US 8,493,571 B2
(45) Date of Patent: Jul. 23, 2013

(54) LASER-OPTICAL POSITION DETECTING MODULE

(75) Inventors: Yen-Yin Lin, Hsinchu (TW); Yuan-Yao Lin, Hsinchu (TW); Shi-Wei Zhu, Taipei (TW); An-Chung Chiang, Taoyuan County (TW); Mang-Shiang Lee, Taoyuan County (TW); Ching-Huei Wu, New Taipei (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 13/409,096

(22) Filed: Feb. 29, 2012

(65) Prior Publication Data

US 2012/0224188 A1    Sep. 6, 2012

(30) Foreign Application Priority Data

Mar. 1, 2011  (TW) .............................. 100106667 A (51) Int. Cl.
  *G01B 11/24*  (2006.01)
(52) U.S. Cl.
  USPC ......................................................... 356/614

(58) Field of Classification Search
  USPC ......................................................... 356/614
  See application file for complete search history.

(56) References Cited

U.S. PATENT DOCUMENTS

| | | | |
|---|---|---|---|
| 2004/0061689 A1* | 4/2004 | Ito .................................. | 345/175 |
| 2011/0026038 A1* | 2/2011 | Kiyose .......................... | 356/614 |

* cited by examiner

*Primary Examiner* — Tu Nguyen (57) ABSTRACT

A laser-optical position detecting module with a laser as a light source is disclosed, which includes a laser mode conversing assembly, having a laser source capable of emitting a time-modulated laser beam; a laser mode conversing unit, used to expand the time-modulated laser beam to a two-dimension sensing plane; a drive control unit, adopted for driving the laser source to emit the time-modulated laser beam; and a detector matrix. The laser mode conversing unit has a phase delay device and a passive optical device capable of reflecting the light; so that, through the laser mode conversing unit, the laser-optical position detecting module can expand the light emitted by the laser source to the two-dimension sensing plane without using any other mechanical scanning.

7 Claims, 7 Drawing Sheets

LASER-OPTICAL POSITION DETECTING MODULE

CROSS-REFERENCE TO RELATED APPLICATION

This application claims foreign priority from a Taiwan Patent Application, Ser. No. 100106667, filed on Mar. 1, 2011.

BACKGROUND OF THE INVENTION

1. Technical Field

The present invention relates to an optical position detecting device, and more particularly, to a laser-optical position detecting module capable of expanding laser beam to a two-dimensional plane without using mechanical scanning.

2. Description of Related Art

With the development of the computer technology, electronic products having touch screens are continuously introduced new in recent, wherein the touch screen provides user to directly touch and control the figures shown in the screen by using an object or fingers. After the user touch and control the figures shown in the screen by using the object or the fingers, a feedback system in the electronic product would drive various hardware and firmware according to the pre-programmed program, so as to show vivid vided effects in the screen. Commonly, the touch screens can be divided into the following types of: resistive touch screen, capacitive touch screen, surface acoustic wave touch screen, and optical touch screen.

Figure 1:
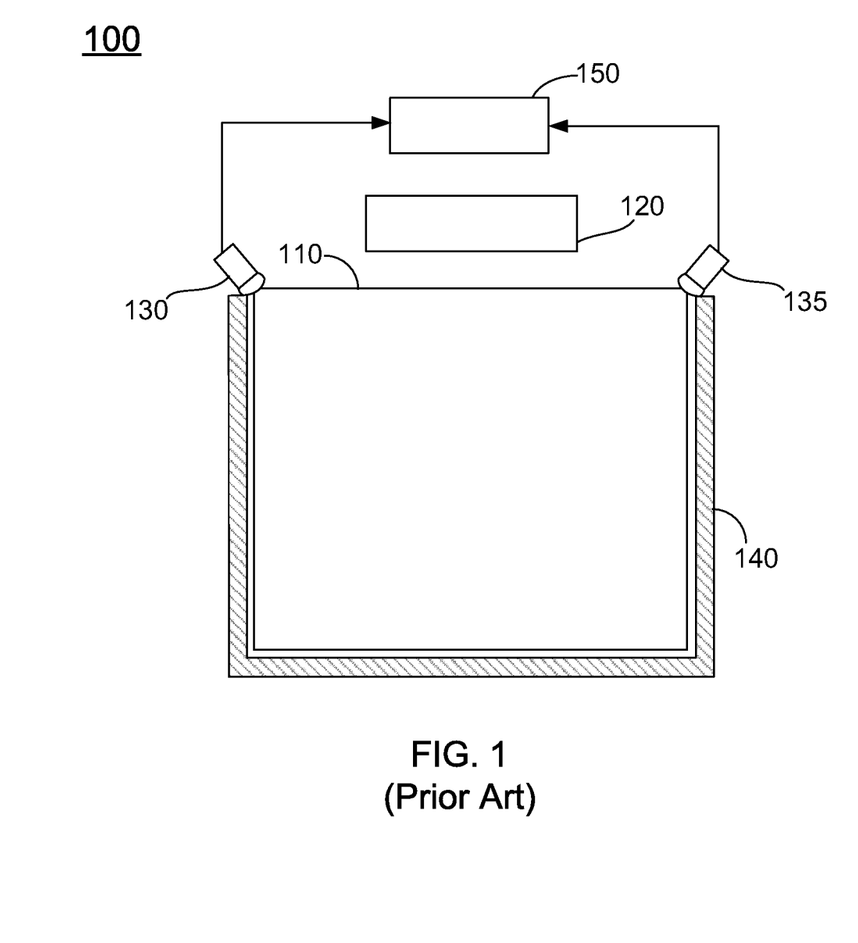
FIG. 1 is a framework diagram of a conventional optical touch display device.

Please refer to FIG. 1, which illustrates a framework diagram of a conventional optical touch display device. As shown in FIG. 1, the conventional optical touch display device 100 includes: a display panel 110, an LED light source 120, a first light detecting device 130, a second detecting device 135, a light-reflecting plate 140, and a processor 150, wherein the light-reflecting plate 140 is used for reflecting light emitted by the LED light source 120, so as to make the light be distributed over the display panel 110. The first light detecting device 130 and the second light detecting device 135 are disposed on the two corners of the display panel 110 for detecting the light signal distributed over the display panel 110. When an object (the fingers or the stylus) touches the display panel 110, the partial light is interdicted, such that the light signal received by the first light detecting device 130 and the second detecting device 135 takes place variation, then the first light detecting device 130 and the second detecting device 135 convert the light signal variation to corresponding electrical signal, and then the electrical signal is transmitted to the processor 150 for process, so as to calculate the corresponding position coordinates of the object.

The conventional optical touch display device 100 is commonly applied in various electronic products with touch screens. However, when the light emitted by the LED light source 120 is reflected in the optical touch display device 100, the light energy may decay due to light scattering because the light belongs to non-coherence light, such that the overall light brightness of the display panel 110 and the detecting accuracy of the first light detecting device 130 and the second light detecting device 135 are reduced. Although the phenomenon of the reducing of the overall light brightness of the display panel 110 can be solved by increasing the quantity of the LED light source 110, such way increases the power consumption on the contrary.

Thus, a concept of substituting the LED light source with laser is proposed for improve the drawback of the above-mentioned optical touch display device 100. For instance, an optical scanning-type touch panel introduced in U.S. Pat. No. 6,492,633, in which the laser is used as the light source of an optical touch panel. Since the laser belongs to coherence light and has high directivity characteristics, the laser energy is not easily to decay when transmitting. However, because the laser has the high directivity characteristics, it must uses mechanical scanning for making the laser cover the two-dimension plane of the optical touch panel; Thus, it is able to understand that the optical scanning-type touch panel disclosed in U.S. Pat. No. 6,492,633 has two drawbacks of: (1) large increasing in cost; and (2) poor mechanical stability.

Accordingly, in view of the conventional optical touch display device and the optical scanning-type touch panel disclosed in U.S. Pat. No. 6,492,633 still have shortcomings and drawbacks, the inventor of the present application has made great efforts to make inventive research thereon and eventually provided a laser-optical position detecting module.

BRIEF SUMMARY OF THE INVENTION

The primary objective of the present invention is to provide a laser-optical position detecting module, in which, laser beam is used as light source, and a phase retarder and a passive optical device used for reflecting the laser beam are arranged; Therefore, the laser beam can be expanded to a two-dimensional detecting plane without using mechanical scanning, and the laser beam can be kept to decay not so easily, so as to maintain the accuracy of the optical detection.

Accordingly, to achieve the abovementioned primary objective, the inventor proposes a laser-optical position detecting module, comprising:

a laser mode conversing assembly, adopted for emitting a modulated laser beam and expending the modulated laser beam to a two-dimensional detecting plane;

a drive control unit, connected to the laser mode conversing assembly for driving the laser mode conversing assembly to emit the modulated laser beam; and a light-detecting array, disposed around the two-dimensional detecting plane for detecting the modulated laser beam;

wherein when an object is located on the two-dimensional detecting plane, the partial modulated laser beam would be interdicted by the object, meanwhile, the laser-detecting array detects the variation of the modulated laser beam and outputs the variation information to the drive control unit, so as to calculate the polar coordinates of the object.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe a laser-optical position detecting module according to the present invention, embodiments of the present invention will be described in detail with reference to the attached drawings hereinafter.

Figure 2:
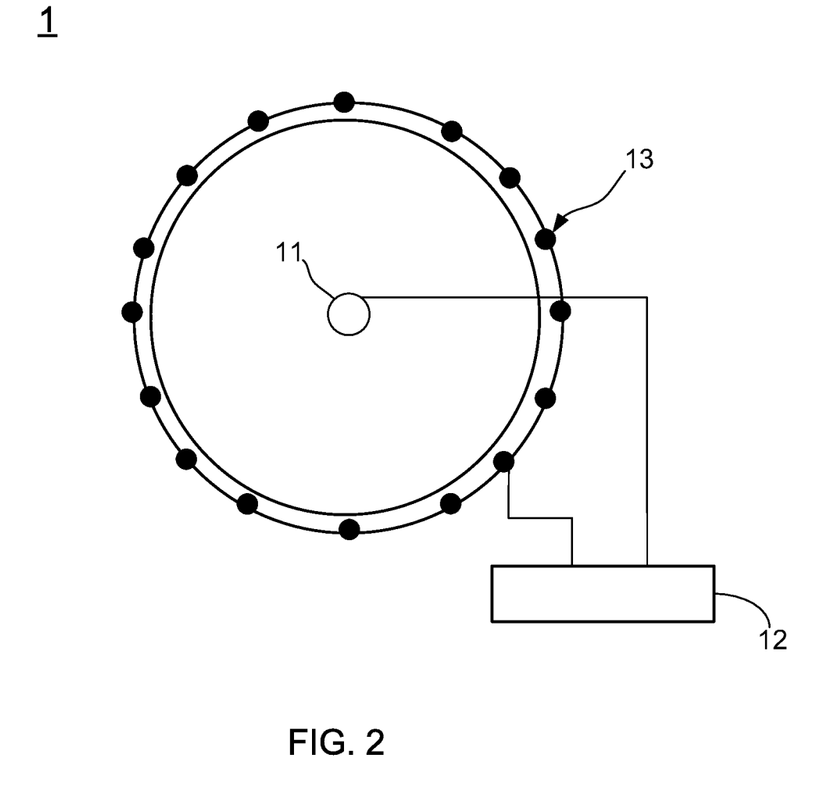
FIG. 2 is a framework diagram of a laser-optical position detecting module according to the present invention.

Please refer to FIG. 2, which illustrates a framework diagram of a laser-optical position detecting module according to the present invention. As shown in FIG. 2, the laser-optical position detecting module includes: a laser mode conversing assembly 11, adopted for emitting a modulated laser beam and expending the modulated laser beam to a two-dimensional detecting plane; a drive control unit 12, connected to the laser mode conversing assembly 11 for driving the laser mode conversing assembly 11 to emit the modulated laser beam; and a light-detecting array 13, disposed around the two-dimensional detecting plane for detecting the modulated laser beam. Wherein when an object is located on the two-dimensional detecting plane, the partial modulated laser beam would be interdicted by the object, meanwhile the laser-detecting array detects the variation of the modulated laser beam and outputs the variation information to the drive control unit 12 for calculating the polar coordinates of the object.

Figure 3:
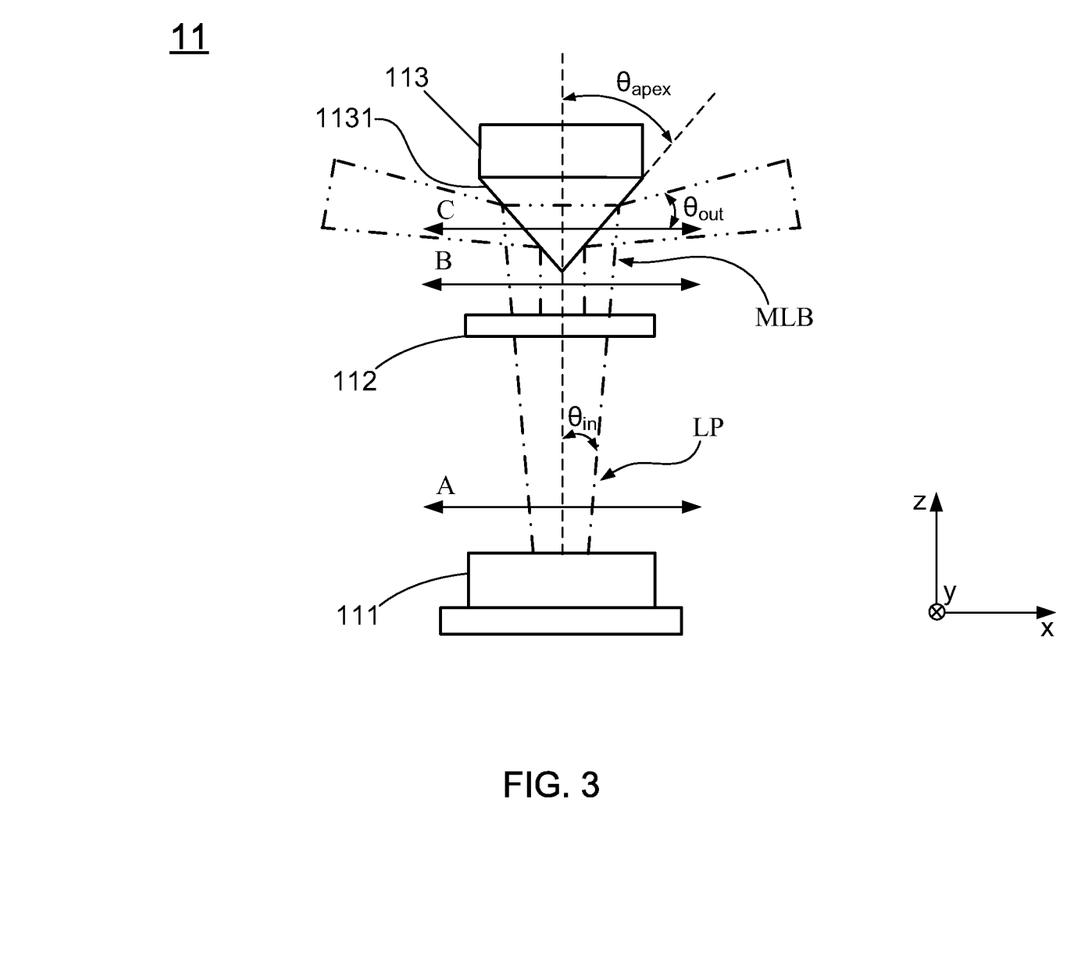
FIG. 3 is a framework diagram of a laser mode conversing assembly of the laser-optical position detecting module according to the present invention.

Please refer to FIG. 3, which illustrates a framework diagram of a laser mode conversing assembly of the laser-optical position detecting module according to the present invention. In the laser-optical position detecting module 1, the laser mode conversing assembly 11 includes an active laser device 111, a phase retarder 112 and a passive optical device 113; as shown in FIG. 3, the active laser device 111 can emit a laser pulse LP to a space and the laser pulse LP performs Gaussian distribution in the space. The phase retarder 112 is opposite to the laser pulse LP and disposed in the space for receiving the laser pulse LP, so as to convert the laser pulse LP to the modulated laser beam MLB. Moreover, in the embodiment of the laser-optical position detecting module 1, the phase retarder 112 must be a material allowing the laser beam to penetrate, for example: a transparent dielectric material or an acrylic; so that, it is able to know that the phase retarder 112 can be made by way of plastic injection molding or mechanical process.

Referring to FIG. 3 again, in the laser-optical position detecting module 1, the passive optical device 113 is faced to the modulated laser beam MLB and disposed on the space for reflecting the modulated laser beam MLB, so as to expand the modulated laser beam MLB on the two-dimensional detecting plane. As shown in FIG. 3, the passive optical device 113 is a direct-reflecting optical cylinder having a three-dimensional total reflection conical surface 1131, and the material of the passive optical device 113 can be metal, dielectric material and acrylic. Besides, the same to the phase retarder 112, the passive optical device 113 also can be made by means of the plastic injection molding or the mechanical process. Furthermore, after the direct-reflecting optical cylinder is fabricated by the plastic injection molding or the mechanical process, the three-dimensional total reflection conical surface 1131 is continuously to be polished and the outer surface thereof is plated with a thin film having high reflection property, such that the three-dimensional total reflection conical surface 1131 is able to reflect the laser beam. Therefore, when the modulated laser beam MLB is emitted into the three-dimensional total reflection conical surface 1131, the modulated laser beam MLB would be reflected and expanded to the two-dimension sensing plane. So that, based one above reasons, in the embodiment of the laser-optical position detecting module 1, the position detecting can be carried out by disposing the light-detecting array 13 around the two-dimension sensing plane. Moreover, since the modulated laser beam MLB performs a specific mode in the space and is expanded to the two-dimensional detecting plane through the three-dimensional total reflection conical surface 1131, the modulated laser beam MLB is not easily led to scattering loss when it is being reflected.

When the modulated laser beam MLB is reflected and ejected out of the three-dimensional total reflection conical surface 1131, the emergence scattering angle can be obtained through the following formula:

$$\theta_{out} = \pm(90° - 2\theta_{apex} + \theta_{in})$$

wherein the $\theta_{in}$ is a maximum scattering angle of the modulated laser beam, $\theta_{out}$ is an included angle of the modulated laser beam and the level line, and the $\theta_{apex}$ is an included angle of the three-dimensional high-reflection conical surface and the perpendicular line. Moreover, when it is in the state that the scattering angle of the incident modulated laser beam, an included angle variation $\Delta\theta_{out}$ conforms to the following formula:

$$|\Delta\theta_{out}| = 2\Delta\theta_{apex}$$

wherein the $\Delta\theta_{apex}$ is an included angle variation of the three-dimensional high-reflection conical surface and the perpendicular line; Thus, through the relations and formulas, it is able to adjust the outputting position of the laser beam by varying the any one included angle variation.

Figure 4:
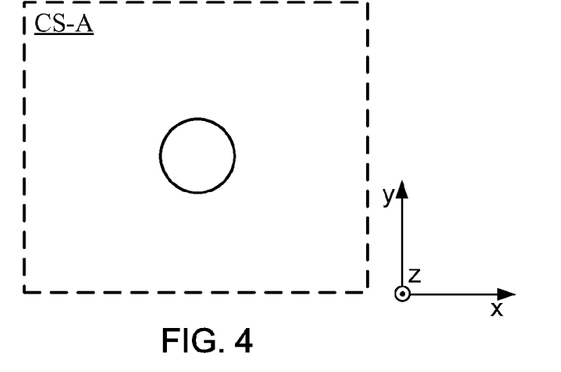
FIG. 4 is a schematic two-dimensional graphics of a modulated laser beam distributing in a CS-A cross-section.
Figure 5:
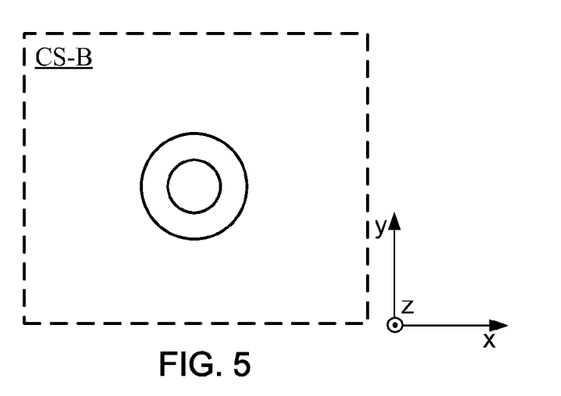
FIG. 5 is the schematic two-dimensional graphics of the modulated laser beam distributing in a CS-B cross-section.
Figure 6:
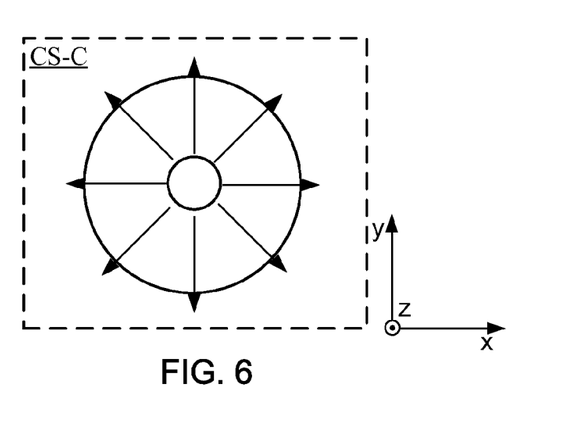
FIG. 6 is the schematic two-dimensional graphics of the modulated laser beam distributing in a CS-C cross-section.

In addition, in order to clearly introduce how the laser mode conversing assembly 11 emits the modulated laser beam MLB and expands the modulated laser beam MLB to the two-dimensional detecting plane, in follows, it will make clearly explanations through schematic two-dimensional graphics. In FIG. 3, three schematic two-dimensional distribution graphics of the modulated laser beam MLB can be obtained after cutting a section line A, a section line B and a section line C along z-axis, respectively. Please refer to FIG. 4, FIG. 5 and FIG. 6, which illustrate the schematic two-dimensional graphics of the modulated laser beam distributing in a CS-A cross-section, a CS-B cross-section and a CS-C cross-section. As shown in FIG. 4, the laser pulse LP emitted by the active laser device 111 performs Gaussian distribution in the space; moreover, as shown in FIG. 5, after the laser pulse LP passes the phase retarder 112, the laser pulse LP is converted to the modulated laser beam MLB; and eventually, as shown in FIG. 6, the modulated laser beam MLB is reflected by the three-dimensional high-reflection conical surface 1131 and expanded in entire CS-C cross-section.

Figure 7:
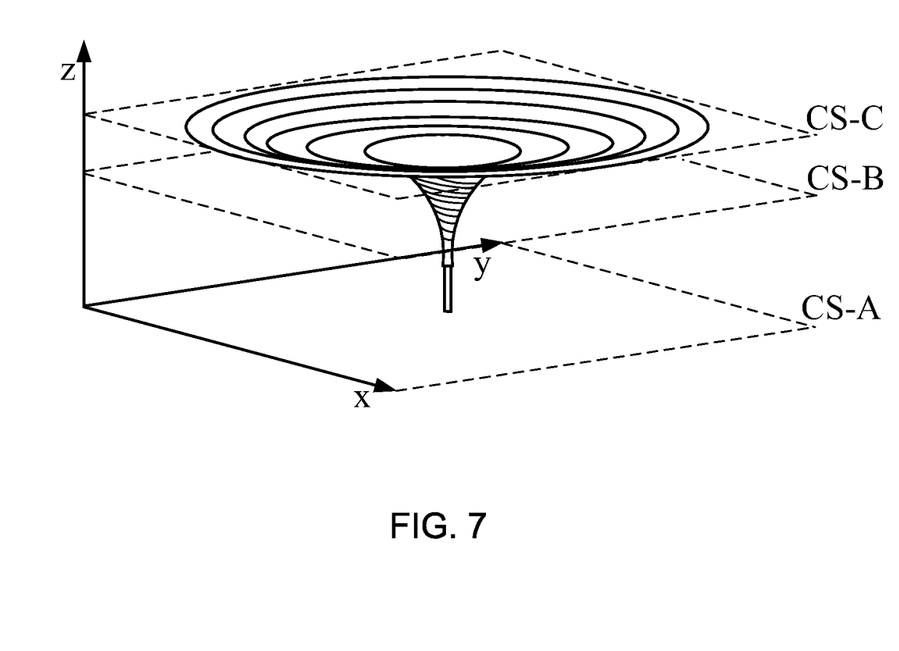
FIG. 7 is a distribution diagram of the laser beam and the modulated laser beam in a three-dimension space.

Moreover, through a 3D distribution diagram, it can further understand how the laser mode conversing assembly 11 emits the laser pulse LP and converts the mode thereof. Please refer to FIG. 7, which illustrates a distribution diagram of the laser beam and the modulated laser beam in a three-dimension space. As shown in FIG. 7, after the laser pulse LP is emitted out of the CS-A cross-section and prorogated to the CS-B cross-section along z-axis, the laser pulse LP is converted to the modulated laser beam MLB, that is, a vortex beam; and then the modulated laser beam MLB is emitted out of the CS-B cross-section; Eventually, the modulated laser beam MLB is expanded in entire CS-C cross-section. In addition, what must be noted is that, the beam intensity in the center of the modulated laser beam MLB is zero because it is the vortex beam; Therefore, when the modulated laser beam MLB is reflected by the three-dimensional high-reflection conical surface 1131, the loss of the laser energy can be reduced and the noised would be restrained at the same time; furthermore, it makes the back-end processing module able to process the laser signal more easily.

Figure 8:
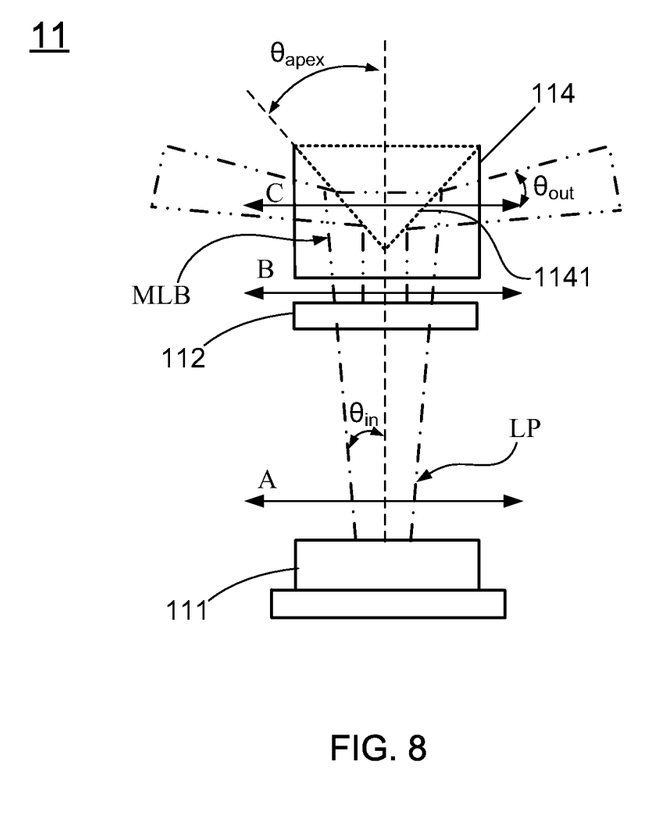
FIG. 8 is a second framework diagram of the laser mode conversing assembly of the laser-optical position detecting module according to the present invention.

Besides, for the laser-optical position detecting module 1 of the present invention, the laser mode conversing assembly 11 further includes a second framework. Please refer to FIG. 8, which illustrates a second framework diagram of the laser mode conversing assembly of the laser-optical position detecting module according to the present invention. As shown in FIG. 8, the second framework of the laser mode conversing assembly 11 includes the active laser device 111, the phase retarder 112 and an total-internal-reflection optical cylinder 114, wherein the material of the total-internal-reflection optical cylinder 114 can be the transparent dielectric material and the acrylic; besides, a concave cone-shape structure 1141 is formed in the inner-side of the total-internal-reflection optical cylinder 114; moreover, the same to the three-dimensional high-reflection conical surface 1131, the surfaces of the total-internal reflection optical cylinder 114 are polished for reducing the scattering loss of the laser beam.

Referring to FIG. 8 again, the modulated laser beam MLB is emitted into the bottom surface of the total-internal reflection optical cylinder 114, and the modulated laser beam MLB is emitted into the concave cone-shape structure 1141 by an incident angle of 45° since the refraction index of the total-internal reflection optical cylinder 114 is greater thane the refraction index of air, at the meantime, the modulated laser beam MLB takes place the total internal reflection inside the total-internal reflection optical cylinder 114, and the total internal reflection makes the included angle of the modulated laser beam MLB reflected by the concave cone-shape structure 1141 and the modulated laser beam MLB emitted into the total-internal reflection optical cylinder 114 be 90°, and makes the modulated laser beam MLB be emitted via the side surface of the total-internal reflection cylinder 114, so as to be expanded to the two-dimensional detecting plane.

Thus, though above description, it is able to know that, in the second framework of the laser mode conversing assembly 11, the laser beam is expanded to the two-dimensional detecting plane by way of the specific structure and the laser-reelection property of the total-internal reflection cylinder 114 without using any movable mechanical apparatus; Besides, differing from the above-mentioned direct-reflecting optical cylinder, the laser beam emitted into the total-internal reflection cylinder 114 is outputted by way of two refraction and one reflection, therefore, through geometrical optics theory, it is able to get the following formula:

$$n \sin(90°-2\theta_{apex}+\sin^{-1}(\sin \theta_{in}/n))=\pm\theta_{out}$$

wherein n is the refraction index of the total-internal reflection cylinder 114, and furthermore, through the formula, it can control the distribution of the modulated laser beam MLB in the two-dimensional detecting plane.

Figure 9:
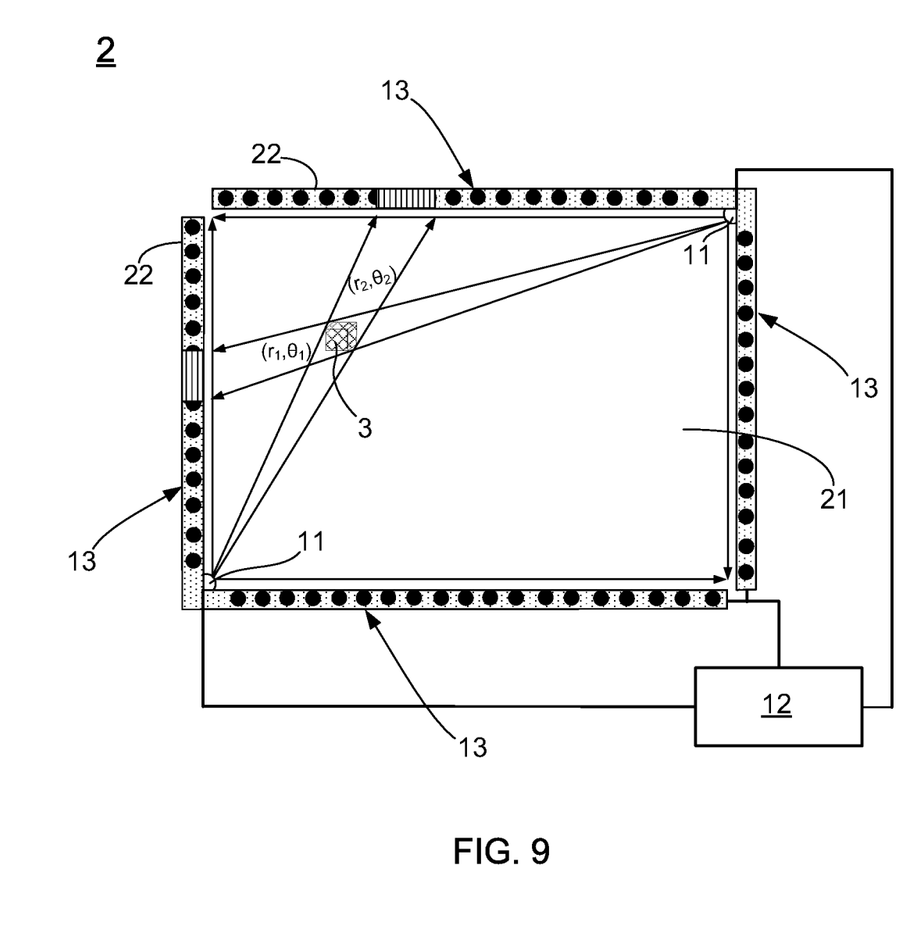
FIG. 9 is a framework of an optical touch screen with the laser-optical position detecting module.

The laser-optical position detecting module is capable of being applied in many fields, such as optical touch screen, automated two-dimensional fruit flies sleep machine, laser engraving, laser process, etc. Please refer to FIG. 9, which illustrates the framework of an optical touch screen with the laser-optical position detecting module. As shown in FIG. 9, the optical touch screen 2 with the laser-optical position detecting module includes a touch panel 21 and a frame 22, wherein two laser mode conversing assemblies 11 are respectively disposed in two corners of the frame 22, and the light-detecting array 13 is disposed in the frame 22; moreover, the drive control unit 12 is electrically connected to the light-detecting array 13 and the laser mode conversing assemblies 11. Thus, when an object 3 (a finger or a stylus) is located at a certain position of the touch panel 21, the modulated laser beam emitted by the laser mode conversing assemblies 11 would be interdicted by the object 3, meanwhile the laser-detecting array 13 detects the variation of the modulated laser beam and outputs the variation information to the drive control unit 12 for calculating the polar coordinates of the object 3 on the touch panel 21. For the framework shown in FIG. 9, in order to increase efficiency, each of laser beams source are regarded as an origin point, respectively, and each of angles of the object 3 on polar coordinates are directly detected for further calculating the plane coordinates.

Thus, through the above descriptions, the laser-optical position detecting module of the present invention has been disclosed completely and clearly in the above description. In summary, the present invention has the following advantages:

1. In the present invention, it mainly designs the structure of the laser mode conversing assembly, and uses the laser pulse emitted from the active laser device of the laser mode conversing assembly and Gaussian distributed on the space as the light source, so as to expand the laser beam to the two-dimensional detecting plane; so that, the laser beam can be covered all of the detecting plane without using mechanical scanning.

2. Inheriting to above point 1, the laser mode conversing assembly includes two frameworks provided with two calculating formulas, respectively; thus, it is able to control and adjust the output position of the laser beam by way of the calculating formulas.

3. Inheriting to above point 2, for the two frameworks of the laser mode conversing assembly, it respectively use the three-dimensional high-reflection conical surface and the concave cone-shape structure to reflect the laser beam, moreover, since the modulated laser beam is the vortex beam, so that the scattering loss of the laser beam can be reduced.

4. The laser-optical position detecting module can be applied in many fields, and more particularly in the present touch screen.

The above description is made on embodiments of the present invention. However, the embodiments are not intended to limit scope of the present invention, and all equivalent implementations or alterations within the spirit of the present invention still fall within the scope of the present invention.

We claim:

1. A laser-optical position detecting module, comprising:
a laser mode conversing assembly, being adopted for emitting a modulated laser beam and expending the modulated laser beam to a two-dimensional detecting plane, the laser mode conversing assembly comprising:
an active laser device, being used for emitting a laser pulse to a space, and the laser pulse performing Gaussian distribution in the space;
a phase retarder, being opposite to the laser pulse and disposed in the space for receiving the laser pulse, so as to convert the laser pulse to the modulated laser beam; and
a passive optical device, being opposite to the modulated laser beam and disposed on the space for reflecting the modulated laser beam, so as to expand the modulated laser beam on the two-dimensional detecting plane;

a drive control unit, being connected to the laser mode conversing assembly for driving the laser mode conversing assembly to emit the modulated laser beam; and a light-detecting array, being disposed around the two-dimensional detecting plane for detecting the modulated laser beam;

wherein when an object is located on the two-dimensional detecting plane, the partial modulated laser beam would be interdicted by the object, meanwhile the laser-detecting array detects the variation of the modulated laser beam and outputs the variation information to the drive control unit for calculating the polar coordinates of the object.

2. The laser-optical position detecting module of claim 1, wherein the modulated laser beam is a vortex beam, and the beam intensity in the center thereof is zero.

3. The laser-optical position detecting module of claim 1, wherein the material of the passive optical device is selected from the group consisting of: metal, dielectric material and acrylic.

4. The laser-optical position detecting module of claim 3, wherein the passive optical device is a direct-reflecting optical cylinder, having a three-dimensional high-reflection conical surface.

5. The laser-optical position detecting module of claim 3, wherein the passive optical device is a total-internal reflection optical cylinder, having a concave cone-shape structure.

6. The laser-optical position detecting module of claim 1, wherein the material of the phase retarder is selected from the group consisting of: transparent dielectric material and acrylic.

7. The laser-optical position detecting module of claim 1, being able to be applied to an optical touch screen.

* * * * *

UNITED STATES PATENT AND TRADEMARK OFFICE
CERTIFICATE OF CORRECTION

PATENT NO. : 8,493,571 B2  
APPLICATION NO. : 13/409096  
DATED : July 23, 2013  
INVENTOR(S) : Yen-Yin Lin et al.

It is certified that error appears in the above-identified patent and that said Letters Patent is hereby corrected as shown below:

On the title page,

Item (75) Inventors: the third name "Shi-Wei Zhu" should read --Shi-Wei Chu--

Signed and Sealed this  
First Day of October, 2013

Teresa Stanek Rea  
*Deputy Director of the United States Patent and Trademark Office*